UNITED STATES PATENT OFFICE.

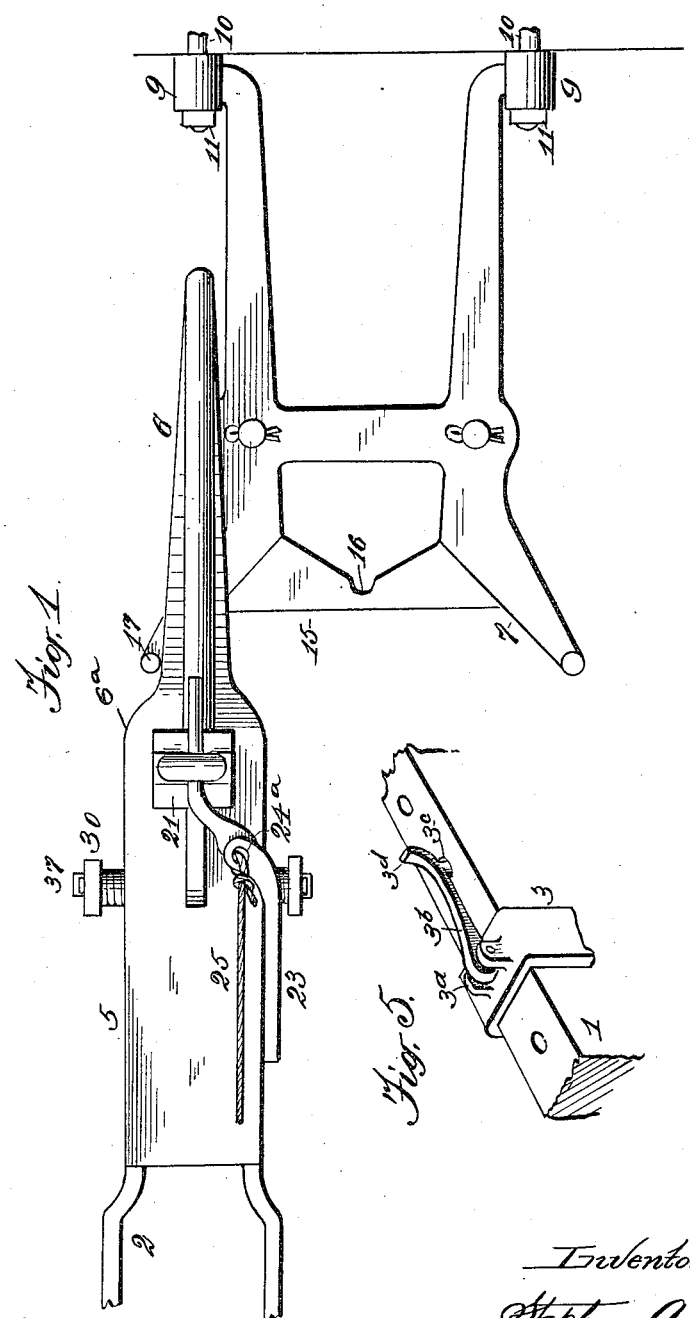

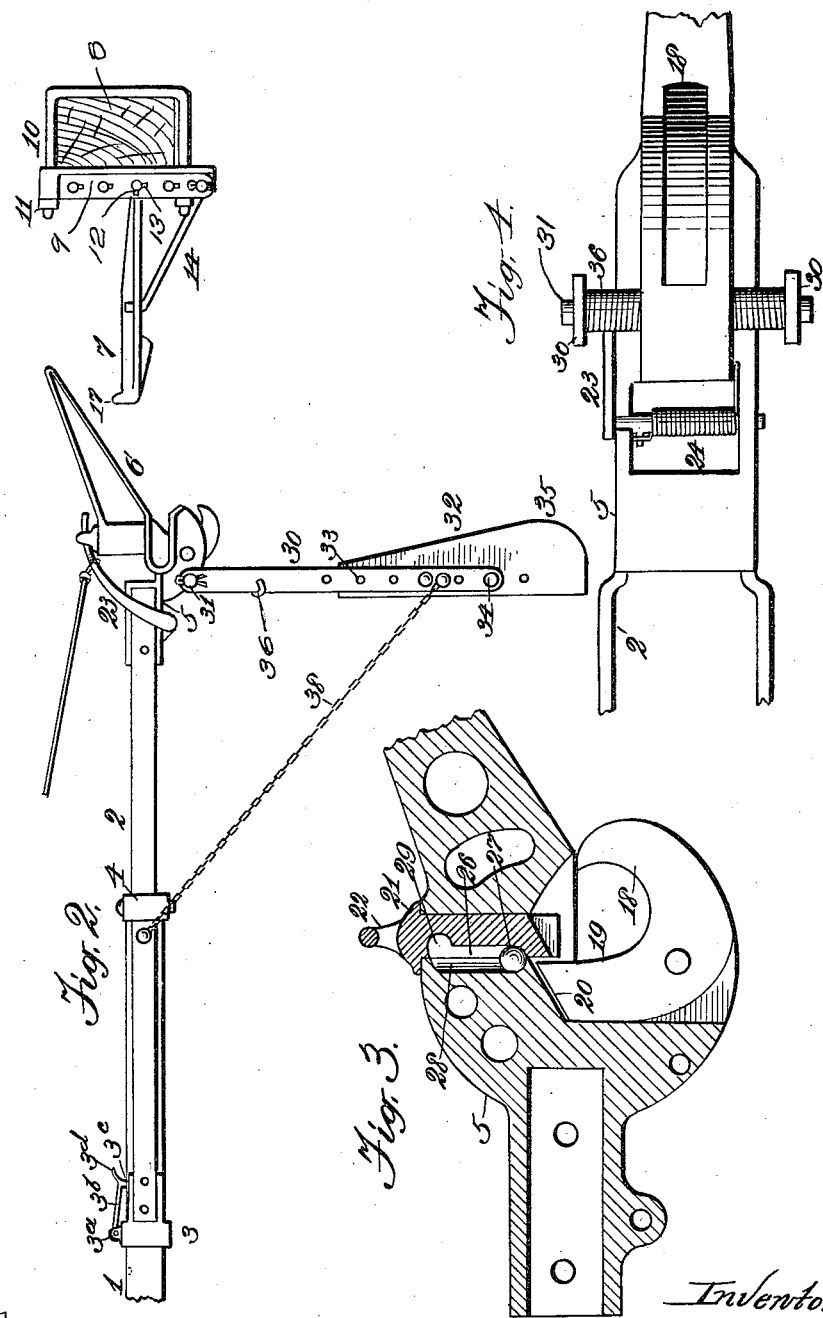

STEPHEN A. SLAUSON, OF CEDAR RAPIDS, IOWA.

HAY-LOADER COUPLING.

1,033,766.  Specification of Letters Patent.  Patented July 23, 1912.

Application filed May 20, 1909. Serial No. 497,285.

*To all whom it may concern:*

Be it known that I, STEPHEN A. SLAUSON, a citizen of the United States, residing at Cedar Rapids, in the county of Linn and State of Iowa, have invented certain new and useful Improvements in Hay-Loader Couplings, of which the following is a specification.

This invention relates to a coupling device for the purpose of connecting a hay loader to an ordinary hay wagon or rack as is in the gathering and loading of hay.

The invention embraces certain improvements in the construction of a coupling device of the type shown and described in my Letters Patent No. 644,338, issued February 27th, 1900. The nature of these improvements will fully appear from the description and claims following, reference being had to the accompanying drawings, in which:—

Figure 1 is a plan view of the coupling portion of my device, the parts constituting portions of the hay loader and hay wagon not being shown. Fig. 2 is a side elevation illustrating the invention as about to couple. Fig. 3 is a central vertical section through that part of the coupler which connects with the hay loader. Fig. 4 is a bottom view of the same the supporting foot being removed for the sake of clearness. Fig. 5 shows in perspective the construction of the reach adjusting device.

The invention is designed to facilitate the coupling of a hay rack or hay carrying wagon to a hay loader. In many cases the weight on the tongue of a hay loader is so great as to make the coupling of the same to a wagon a difficult and laborious operation. By means of this device it is possible for the driver of a hay wagon to simply back his vehicle around in position and couple as the wagon is backed. The device is so constructed that this act of coupling somewhat elevates the tongue of the hay loader and correspondingly depresses the hay gathering mechanism, so as to insure a clean raking of the field.

Referring now to the drawings, the invention will be described, numerals being used to designate the various parts. The tongue of the hay loader, 1 is provided with an extension 2, to which the coupling member of the hay loader is rigidly attached. This extension comprises a pair of flat steel bars separated so as to straddle the tongue. At the loader end these bars connect with a stirrup 3 embracing the tongue. This is provided with lugs $3^a$ in which is pivoted a latch $3^b$ having a depending nose $3^c$ to engage holes bored in the top of the tongue. The latch is disengaged by means of a finger piece $3^d$ projecting from its forward end. At the front end of the tongue and bolted thereto is another stirrup 4 embracing the bars and holding them securely but slidably in position, so that on detaching the latch the tongue may be shortened or extended, as desired. As the tongue while in use is somewhat inclined, it is evident that this lengthening and shortening of the tongue will have the effect of varying correspondingly the pressure of the rake mechanism on the ground. The adjustment for this purpose, however, is more especially shown at the right in Fig. 2, and will be described presently. The coupling head 5 which is attached to the front end of these extension bars, is in the main similar to that shown in my former patent. It has a forwardly and upwardly extending horn or nose 6 adapted to engage with a link 7, which connects by the adjusting mechanism above referred to with the rear sill 8 of a hay wagon or rack. By reference to Fig. 1 it will be seen that this link is bifurcated at the front end and that each leg connects with an adjusting plate 9 forming a part of the connection with the sill. Through suitable holes in these plates pass stirrups 10 provided with nuts 11, by means of which the device is attached to the sill. It will be noted that these plates are provided with a series of holes to take terminal studs on the legs of the link. These studs are provided with nibs 12 which pass through notches 13 in the holes of the adjusting plates, so that the parts may be readily connected by turning the plates parallel with the link, but when in operative position at right angles the parts are securely locked together. Braces 14 are provided for this purpose, the bent ends of the braces passing through holes in the plates and in the link, respectively, and being secured therein by cotter pins. The rear end of this link flares as shown, so as to present quite a wide lateral extent to make easy contact with the nose of the coupling head on the hay loader, so that the coupling may be done without great nicety of adjustment of the position of the tongue with respect to the hay wagon. Extending across these diverging arms is a cross bar 15, the forward portion of which is inclined to a central socket 16 into which the coupling hook, presently to be described, is drawn when the wagon moves forward. The extreme ends of these diverging arms are provided with upwardly extending nibs 17 which are adapted to contact with the sides 6ª of the diagonal horn 6 as the link moves backwardly, and thus force the parts into proper coupling positions, as will be seen by reference to Fig. 1.

Pivoted in a chamber formed within the coupling head is a hook 18 adapted to swing back and forth to couple and uncouple, its forward movement being determined by gravity. The hook of this member engages the link at 16 when in coupling position, as above mentioned. In the act of coupling this cross-bar of the link strikes the vertical tail-piece of the hook 19, which has an inclined face at 20 bearing against a latch-block 21, having a similarly inclined face at the lower end. In an eye 22 at the upper end of the latch block is a pivoted finger 23 provided with a spring 24, which tends normally to force the free end of the finger downwardly, and with it the latch-block. This finger is provided with an eye 24ª, to which is connected a pull-cord 25 by which the operator uncouples the loader from the wagon. In the back side of the latch-block 21 is formed a groove 26 about half the diameter in depth, of a ball 27. A corresponding groove 28 is formed in the adjacent housing, the grooves coming to an end at the top and bottom as shown. This serves to hold the latch-block securely in its seat at all times, but also provides a simple, inexpensive and efficient anti-friction device, so that the latch-block plays up and down very easily and freely, and admits of the uncoupling being done even while the hay loader is being drawn along the ground. Provision is made for inserting or removing the latch-block, and this consists simply in forming a pocket at 29 corresponding in depth to the full diameter of the ball. When the parts are turned bottom side up the ball runs into this pocket and the latch-block may be easily removed.

The coupling end of the loader tongue is provided with a supporting leg 30 pivoted to the coupling head on studs 31 and provided with an adjustable foot 32. The leg comprises a pair of flat steel bars pierced by a number of holes 33, and similar holes are provided in the foot. The bars straddle the foot and are secured thereto by a pair of bolts 34. It will be noted that in Fig. 2 the forward lower portion of this foot is rounded at 35, so that in case it drags on the ground at any time it runs over but does not pick up any hay in its path. The leg is held in its forward position by a pair of coiled springs 36 mounted on the pivot studs 31. Forward movement of the leg is limited by a chain 38 connecting with the leg at one end and at the other end with the hay loader tongue. The leg furnishes a natural support for the tongue, and being adjustable in length permits the coupling head to be set at such a position as to readily engage the forward link in coupling.

Having thus described my invention, I claim:

1. In a coupling for hay loaders, a body portion or head with a pair of jaws, a hook mounted therein, a latch-block to engage said hook, a pivoted, spring actuated finger engaging said latch-block by its free end, a suitable pull connecting with said finger, and a link adapted to couple said head to the hay rack by engaging said hook.

2. In a hay loader coupling, the combination with a hay wagon link, of a coupling head for the hay loader tongue provided with jaws to embrace said link, a hook pivoted in said head to engage said link, and a latch-block to engage the hook in holding position, the latch-block being grooved on one side and a corresponding groove being provided in the housing therefor, and a ball mounted in said groove.

3. In a hay loader coupling, a double jawed head, a hay wagon link to engage therewith, a hook mounted within said jaws and adapted to engage said link, a latch-block for said hook, the latch-block and its housing being adjacently grooved to admit a ball, and a pocket formed near the extremity of one groove to receive the ball when the head is inverted, and a ball placed in said groove and adapted to lock the latch-block against accidental removal while in normal position.

4. In a hay loader coupling, the combination of a coupling head attached to the hay loader and provided with a vertically inclined guiding nose, the sides of which diverge transversely toward the rear, and a link adapted to engage said head and having diverging extremities provided with upward extending nibs adapted to engage the diverging sides of the nose to aline the engaging parts of the head and link, substantially as set forth.

5. The described support for a hay loader tongue and its coupling device, consisting of a leg pivoted to the coupling, a spring tending to hold the leg forwardly, a flexible connection of the leg with the tongue to limit its forward movement, and a foot adjustable up and down on said leg and rounded forwardly, substantially as and for the purpose set forth.

6. In a device of the class described, the combination of a pair of stirrups adapted to engage a hay wagon, two vertical uprights secured in place by the said stirrups and provided with series of holes arranged oppositely in pairs, a bifurcated link having lateral lugs adapted to enter one pair of the said holes, diagonal braces between the said link and the said uprights, and a coupling head adapted to engage with the link, substantially as set forth.

7. In a device of the class described, the combination of two hay loader coupling members, a hay loader tongue provided with a terminal stirrup, two bars connected at their forward ends with one of the coupling members and mounted to slide through the said terminal stirrup, a second stirrup connected to the bars at their rear end and slidably surrounding the tongue, and a latch connected with the second stirrup and adapted to engage with holes in the tongue, substantially as set forth.

8. In a hay loader coupling, the combination of two coupling members, attaching means for one of them comprising two parallel uprights each provided with a plurality of holes, two horizontal studs on the coupling member, each stud being adapted to enter a hole in one of the uprights, means for locking the studs in place, and supplementary supporting means for the coupling member, substantially as set forth.

9. In a hay loader coupling, the combination of two coupling members, a supporting device for one of them comprising two parallel uprights, each provided with a plurality of circular holes with notches, studs on the connecting member adapted to enter the apertures, projections on the studs adapted to pass through the notches of the holes when the coupling member is in an inoperative position and to prevent the removal of the studs when the coupling member is in operative position, and means for holding the coupling member in operative position, substantially as set forth.

10. In a hay loader coupling, the combination of two coupling members, one adapted to be connected to a hay wagon, one adapted to be connected to a hay loader and provided with a ground engaging support, and both of said coupling members being vertically adjustable relative to their supports and independently of each other, substantially as set forth.

11. In a hay loader coupling, the combination of a rear coupling member having a forward and upward inclined horn provided with backward and laterally diverging sides, and a forward coupling member having parts adapted to engage the bottom and one side or the other of the said horn to cause both horizontal and transverse alinement of the two members, substantially as set forth.

12. In a hay loader coupling, the combination with a coupling head adapted to be attached to a hay loader and provided with a vertically inclined guiding nose, and a link adapted to be connected with a hay wagon and having parts positioned to engage the sides of the said nose to limit relative lateral movement of the head and link, substantially as set forth.

13. In a hay loader coupling, the combination of two coupling members, one of which is provided with converging jaws having transversely diverging sides, and the other of which is adapted to engage the said jaws to cause horizontal alinement and is provided with backward and transversely diverging fingers adapted to coöperate with the diverging sides of the jaws of the other member to cause transverse alinement, substantially as set forth.

14. In a hay loader coupling, the combination of two coupling members, one of which is provided with an upward inclined horn and has diverging sides, and the other of which is adapted to engage the said horn to cause horizontal alinement and is provided with diverging fingers adapted to coöperate with the diverging sides of the other member to cause transverse alinement, substantially as set forth.

15. In a hay loader coupling, the combination of two coupling members, one of which is provided with an upward inclined horn and lateral projections having diverging sides, and the other of which is adapted to engage the said horn to cause horizontal alinement and is provided with diverging fingers adapted to engage at their outer ends with the sides of the projections to cause partial transverse alinement and to further engage intermediate their ends with the projections to cause further transverse alinement, substantially as set forth.

16. In a hay loader coupling, the combination of two coupling members, one of said members being provided with a pocket and locking means, and the other being provided with a transverse bar adapted to enter the pocket and to be engaged by the locking means, the said bar having a central notch and sides inclined toward said notch, the said notch being adapted for engagement with the locking means and the said inclined sides tending to cause the engagement of the notch and locking means, substantially as set forth.

17. In a device of the class described, the combination of a hay loader tongue, a leg connected with the tongue and adapted to swing rearward relative thereto, and two companion coupling elements, one connected to the tongue and the other adapted to be connected to a hay wagon, the element connected to the tongue having a part adapted to be engaged by the element connected to the wagon to lift the tongue element and with it the tongue and leg, substantially as set forth.

18. In a mechanism for coupling a hay wagon and a hay loader, the combination of a leg below the front of the loader and adapted to swing relatively thereto in a backward direction, an automatic two-part coupler having one part secured to the wagon and the other to the loader, the coupler part secured to the loader having a device adapted to be engaged by the coupler part secured to the wagon to lift the forward part of the loader at the time of coupling, and means for automatically moving the said leg to its operative position, the said means being supplementary to the action of gravity upon the leg itself, substantially as set forth.

19. In a mechanism for coupling a hay wagon and a hay loader, the combination of a leg for supporting the front part of the loader, means for adjusting the length of the leg, and an automatic two-part coupler having one part adjustably secured to the wagon and the other secured to the loader, the said coupler being adapted to lift the front part of the loader at the time of coupling, substantially as set forth.

20. In a mechanism for coupling a hay wagon and a hay loader, the combination of a leg adapted to support the front part of the coupler and pivoted thereto to swing backward, a spring for normally holding the leg in its operative position, and an automatic two-part coupler having one part secured to the wagon and the other part secured to the loader, the said coupler being adapted to lift the front part of the loader at the time of coupling, substantially as set forth.

21. In a mechanism for coupling a hay wagon and a hay loader, the combination of two companion coupling elements, means for connecting one of them to the wagon and a device for connecting the other of them to the loader, the said device comprising a tongue secured to the loader and two parallel bars engaging the sides of the tongue, stirrups surrounding the tongue and bars to maintain them in slidable engagement, and means for locking the bars in position relative to the tongue, substantially as set forth.

22. In a mechanism for coupling a hay wagon and a hay loader, the combination of two companion coupling members, means for connecting one of them to the wagon and a device for connecting the other of them to the loader, the said device comprising a tongue secured to the loader, connecting elements secured to the coupling member and slidably engaging the tongue, and means for locking the said connecting elements in position relative to the tongue, substantially as set forth.

23. In a mechanism for coupling a hay wagon and a hay loader, the combination of two companion coupling members, means for connecting one of them to the wagon, a vertical leg for supporting the other of them from the ground, and a device for connecting the said second element to the loader, the said device comprising a tongue secured to the loader, connecting elements secured to the coupling member, and means for locking the said connecting elements in position relative to the tongue, substantially as set forth.

24. In a mechanism for coupling a hay wagon and a hay loader, the combination of two companion coupling members, means for connecting one of them to the wagon, a leg adjustable in length for supporting the other of them from the ground, and a device for connecting the said second coupling element to the loader, the said device comprising a loader supporting tongue, and means for adjustably connecting the coupling member to it, substantially as set forth.

25. In a mechanism for connecting a hay wagon and a hay loader, the combination of two companion coupling elements, means for connecting one of them to a wagon, and a device for connecting the other of them to the loader, the said device being extensible and adapted to support the forward end of the loader, substantially as set forth.

In testimony whereof I affix my signature in presence of two witnesses.

STEPHEN A. SLAUSON.

Witnesses:
J. M. St. John,
Charles Estes.

---

Copies of this patent may be obtained for five cents each, by addressing the "Commissioner of Patents, Washington, D. C."